May 21, 1963 J. W. WENNER ETAL 3,090,708
PROCESS FOR CLEANING A RECORD CARRIER
Filed June 28, 1961
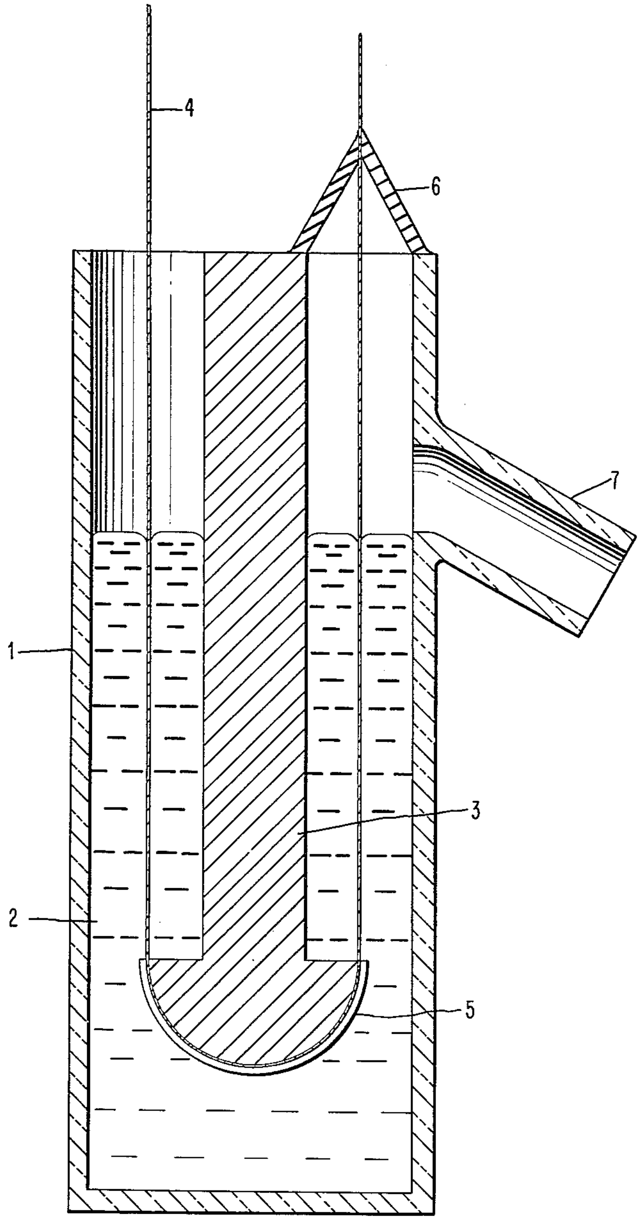
INVENTORS
JOHN W. WENNER
ANTON G. WELLBROCK
BY Bertram M. Mullin
ATTORNEY United States Patent Office 3,090,708
Patented May 21, 1963

3,090,708

PROCESS FOR CLEANING A RECORD CARRIER

John W. Wenner and Anton G. Wellbrock, Poughkeepsie, N.Y., assignors to International Business Machines Corporation, New York, N.Y., a corporation of New York Filed June 28, 1961, Ser. No. 120,264
1 Claim. (Cl. 134—15)

The invention relates to a method for cleaning material in the form of a tape, sheet, plate, ribbon, web, or the like. In particular, the invention relates to a method for cleaning record carriers, such as magnetic recording tapes used in data processing and computer machines.

The invention provides a method for cleaning sheet-like material which requires to an extreme degree the absence of all foreign matter from its surface in the performance of its function.

Foreign matter tends to produce undesirable effects if not removed from a surface. The mere contacting of foreign matter with a surface is sufficient to bring about the gradual mechanical deterioration of that surface. If the foreign matter includes particles which are relatively hard in comparison to the surface, surface abrasion and wear is likely to take place. On a record carrier, this may result in a loss of information. Even if the foreign matter does nothing more than obscure minute areas of surface on a record carrier, it becomes difficult to accurately record and sense intelligence on the carrier. Consequently, the record carrier reliability is reduced.

The recent advances in computer technology have placed increased emphasis on magnetic recording tapes capable of operating at high speeds with nearly perfect reliability. In order to provide tape with the required reliability, it is necessary to use a cleaning procedure which ensures the removal of the foreign matter from the surface of the tape. Various methods have been proposed for cleaning a tape; however, these methods have disadvantages such as failure to effectively remove all foreign matter or to remove all foreign matter without producing undesirable surface effects.

It is an object of the invention to provide an improved method for cleaning a sheet-like material.

A further object of the invention is to provide an improved process for treating the surface of a record carrier.

An additional object of the invention is to provide an improved process for conditioning a magnetic recording tape to enhance the tape with improved reliability.

A further object of the invention is to provide an improved method for cleaning a record carrier.

In accordance with the invention, the foreign matter on a surface of a sheet-like material such as a record carrier is entrapped and carried away by a body of mercury brought in contact with the surface thereof.

The foregoing and other objects, features and advantages of the invention will be apparent from the following more particular description of a preferred embodiment of the invention, as illustrated in the accompanying drawing.

The drawing is a diagrammatic cross-sectional view of an apparatus which may be used to practice the method of the invention.

According to the invention, a sheet-like material is cleaned by passing it through, immersing it in, or by placing it in contact with a body of mercury. The mercury has the ability to surround and entrap foreign particles on a surface of the material. We believe this ability is due to the peculiar physical properties of the mercury, such as its density, fluidity, surface tension, and electrical conductivity.

Referring to the apparatus shown in the drawing to more particularly describe the method of the invention, tank 1 holds a mercury bath 2. Tape 4 is passed around a guide 3 submerged in mercury bath 2 so that, by feeding the tape longitudinally, its surfaces are successfully made to pass through the mercury. Flanges 5 on guide 3 maintain the tape about the guide as it is moved through the bath. Wipers 6 are provided adjacent the tape exiting position to remove mercury clinging to the tape. Spout 7 is provided to carry away the overflow of any mercury. Tape 4 may be moved through the bath by a simple means, such as rotating capstans (not shown) or the like.

By use of an apparatus such as described above, a magnetic recording tape is cleaned by placing it in contact with a body of mercury and passing it through the mercury so that the mercury surrounds and traps any defects and foreign particles on the tape and removes the same. The cleaning ability of mercury is evaluated by recording a predetermined record on the mercury-cleaned tapes and sensing the tapes for the record. These tests indicate that mercury-cleaned tapes have nearly perfect reliability and surfaces on which the migration of foreign particles is inhibited.

Magnetic recording tape having a resinous substrate of polyethylene terephthalate coated with magnetic particles in a binder, such as poly-vinyl-chloride and butadiene acrylonitrile, yield the results described above. Similar results are obtainable with record carriers of cellulose acetate and cellulose nitrate.

While the invention has been particularly shown and described with reference to a preferred embodiment thereof, it will be understood by those skilled in the art that the foregoing and other changes in form and details may be made therein without departing from the spirit and scope of the invention.

We claim:

A process for treating magnetic recording tape of the type used in data processing and computer machines to provide said tape with nearly perfect reliability in the performance of its intended function, said process comprising the steps of:

placing said magnetic recording tape in a body of mercury; and, passing said tape longitudinally through said body of mercury to remove foreign particles from the surface of the tape and to condition the surface of said tape so as to inhibit the formation of further particles.

References Cited in the file of this patent

UNITED STATES PATENTS

| | | |
|---|---|---|
| 1,232,077 | Planchat | July 3, 1917 |
| 1,273,928 | Rosenfield | July 30, 1918 |
| 1,595,237 | Minton | Aug. 10, 1926 |
| 2,522,071 | Tait | Sept. 12, 1950 |
| 3,007,815 | Richter | Nov. 7, 1961 |